United States Patent
Thompson

[11] Patent Number: 6,121,392
[45] Date of Patent: Sep. 19, 2000

[54] LOW SOFTENING POINT BETA-PINENE-BASED RESINS WITH IMPROVED MOLECULAR WEIGHT DISTRIBUTION

[75] Inventor: Kerry L. Thompson, Panama City, Fla.

[73] Assignee: Arizona Chemical Company, Jacksonville, Fla.

[21] Appl. No.: 08/855,710

[22] Filed: May 8, 1997

[51] Int. Cl.[7] .................... C08F 2/06; C08F 4/44; C08F 4/14; C08F 10/14

[52] U.S. Cl. .................. 526/89; 526/90; 526/91; 526/195; 526/206; 526/210; 526/226; 526/237

[58] Field of Search .............. 526/89, 210, 226, 526/237, 91, 90, 195, 206

[56] References Cited

U.S. PATENT DOCUMENTS

| | | |
|---|---|---|
| 2,373,706 | 4/1945 | Ott . |
| 2,567,918 | 9/1951 | Burroughs . |
| 2,932,631 | 4/1960 | Rummelsburg . |
| 3,297,673 | 1/1967 | Seller, Jr. et al. . |
| 3,313,865 | 4/1967 | Vohwinkel . |
| 3,467,632 | 9/1969 | Davis . |
| 3,478,007 | 11/1969 | Barkley et al. . |
| 3,893,986 | 7/1975 | Komai et al. . |
| 3,923,759 | 12/1975 | Kennedy et al. . |
| 3,959,238 | 5/1976 | Hokama et al. ............ 526/281 |
| 4,011,385 | 3/1977 | Wang et al. ............... 526/190 |
| 4,022,723 | 5/1977 | Hokama et al. . |
| 4,052,549 | 10/1977 | Booth ....................... 526/237 |
| 4,487,901 | 12/1984 | Malpass, Jr. ............... 526/185 |
| 4,670,504 | 6/1987 | Cardenas et al. ........... 524/504 |
| 4,857,617 | 8/1989 | Tanaka et al. .............. 526/237 |
| 4,879,351 | 11/1989 | Schluenz ................. 525/332.1 |
| 5,051,485 | 9/1991 | Schmid et al. ............. 526/208 |

*Primary Examiner*—Jeffrey C. Mullis
*Attorney, Agent, or Firm*—Luedeka, Neely & Graham, P.C.

[57] ABSTRACT

The specification discloses a method for producing low softening point beta-pinene based polyterpene resins having an essentially unimodal molecular weight distribution, as well as resins made by the method. In the process a beta-pinene monomer is reacted with an olefinic co-monomer in the presence of a Lewis acid catalyst and a co-catalyst under reaction conditions sufficient to produce a beta-pinene-based copolymer having a softening point in the range of from about 85° to about 125° C., an essentially unimodal molecular weight distribution, and a bound chlorine level of less than about 400 ppm. Because of their low softening points and essentially unimodal molecular weight distributions, the beta-pinene-based resins of the invention are expected to exhibit improved compatibility with block copolymers used in modern adhesive formulations.

21 Claims, No Drawings

LOW SOFTENING POINT BETA-PINENE-BASED RESINS WITH IMPROVED MOLECULAR WEIGHT DISTRIBUTION

FIELD OF THE INVENTION

The present invention relates to methods for producing beta-pinene-based polyterpene resins and to resins made by such methods, especially beta-pinene-based resins having low softening points.

BACKGROUND

Polyterpene resins are used extensively in adhesive formulations to modify the wettability and tack of the adhesives and are produced commercially by a catalyzed polymerization of various terpenoids. Beta-pinene resins have been produced for many years for use in solvent-based adhesives, but have not found wide application in modem adhesive formulations due to their bimodal molecular weight distributions and relatively high molecular weights.

Attempts to improve the compatibility of beta-pinene-based polyterpene resins with commercially available adhesives and hot melts have met with limited success. Adding mineral oils, dimer oils and plasticizers can improve the rheology, but these tend to reduce the tack and create other problems which diminish the effectiveness of the resin. Catalyst modifiers such as ketones have also been attempted but the resulting resins, while exhibiting lowered softening points, have relatively high levels of bound chlorine and exhibit relatively poor thermal stability in many applications.

It is therefore an object of this invention to provide relatively low softening point beta-pinene-based resins having essentially unimodal molecular weight distributions.

Another object of the invention is to provide a method for making beta-pinene based resins having essentially unimodal molecular weight distributions and relatively low softening points.

Still another object of the invention is to provide beta-pinene-based resins which exhibit improved compatibility in a wide range of currently available hot melt and pressure-sensitive adhesives, especially those containing block copolymers.

An additional object of the invention is to provide beta-pinene-based resins which exhibit a low level of bound chlorine.

With regard to the above and other objects, the invention provides a method for making a low softening point beta-pinene-based polyterpene resin which consists essentially of reacting a mixture containing beta-pinene monomer and an olefinic monomer selected from the group consisting of diisobutylene, 2-methyl-2-butene, dipentene, alpha-pinene and p-menthadiene in the presence of an organic solvent, a Lewis acid catalyst and a co-catalyst at a temperature and for a time sufficient to produce a beta-pinene-based copolymer having a softening point in the range of from about 85° to about 125° C. and an essentially unimodal molecular weight distribution.

In another aspect, the invention provides a beta-pinene-based polyterpene resin consisting essentially of from about 60 to about 95 wt. % beta-pinene monomer units and from about 5 to about 40 wt. % olefin monomer units selected from the group consisting of diisobutylene, 2-methyl-2-butene, alpha-pinene, dipentene and p-menthadiene units. The resin has a softening point in the range of from about 85° to about 125° C., an essentially unimodal molecular weight distribution and a bound chlorine level of less than about 400 ppm.

Because of their essentially unimodal molecular weight distributions, beta-pinene-based polyterpene resins according to the invention are expected to exhibit improved compatibility with A-B and A-B-A block copolymers having styrene end-blocks and conjugated diene midblocks as compared with terpenic resins made using prior methods.

The reaction mixture for production of beta-pinene-based polyterpene resins according to the invention contains beta-pinene and olefinic monomers in an organic solvent along with a catalyst and co-catalyst. The beta-pinene monomer may be selected from relatively pure beta-pinene or commercially available mixtures of beta-pinene and other terpenes. A particularly preferred source of beta-pinene is monomer grade beta-pinene monomer which typically contains about 80 wt. % beta-pinene and about 14 wt. % alpha-pinene.

The olefinic monomer to be co-polymerized with the beta-pinene monomer may be selected from the group consisting of diisobutylene, 2-methyl-2-butene, dipentene, alpha-pinene and p-menthadiene. As used herein, "p-menthadiene" means commercial mixtures of dipentene and isomers thereof. Mixtures of two or more of the foregoing olefinic monomers may also be used.

The reaction mixture may contain from about 2:98 to about 50:50 mole ratio of olefinic monomer to beta-pinene monomer with a preferred molar ratio ranging from about 5:95 to about 40:60. It is particularly preferred to have at least about 60 mole percent beta-pinene in the reaction mixture so that the resulting polyterpene will contain at least about 50 to about 60% beta-pinene units by weight.

The catalyst may be selected from one or more Lewis acid catalysts. Of these, aluminum chloride and titanium chloride are preferred with aluminum chloride being particularly preferred. The amount of catalyst relative to monomer in the reaction mixture may range from about 0.3 to about 3 wt. % of the total weight of the monomers with from about 1.0 to about 2.0 wt. % catalyst being particularly preferred.

The co-catalyst may be selected from water, alcohol, an ester and an organohalide of the formula

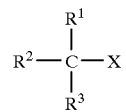

wherein $R^1$, $R^2$ and $R^3$ are alkyl or aryl groups containing from about 1 to about 10 carbon atoms and X is a halide selected from chlorine, bromine and iodine. Combinations of two or more co-catalysts may also be used. Examples of tertiary organohalides which may be used as the co-catalyst include tert-butyl chloride and 2-phenyl-2-chloropropane.

Alcohols which may be used as the co-catalyst have the formula ROH wherein R is an alkyl or aralkyl group containing from about 1 to about 10 carbon atoms. Examples of alcohols which may be used include, but are not limited to, methanol, ethanol and the $C_{10}$-terpenyl alcohols commonly found in commercially available terpene hydrocarbons.

The amount of co-catalyst in the reaction mixture should be sufficient to produce a beta-pinene-based resin having an essentially unimodal molecular weight distribution. For example, when water is used as a co-catalyst and assuming no significant amount of other protic co-catalysts are present in the reaction mixture, the amount of water used as a co-catalyst is substantially higher than the amount needed to initiate and sustain a terpene polymerization reaction. Accordingly, when using aluminum chloride as the catalyst, the molar ratios of monomer/AlCl$_3$/water in the reaction mixture may be about $1.0/3.1\times10^{-3}$ to $3.0\times10^{-2}/5\times10^{-4}$ to $3.0\times10^{-2}$, and are preferably about $1.0/1.0\times10^{-2}$ to $2.0\times10^{-2}/2.0\times10^{-3}$ to $4.0\times10^{-3}$.

The exact amount of water used may be determined experimentally for a given reaction mixture. If too much water is used, highly chlorinated resins or low yields may result. Accordingly, when water is used as the co-catalyst a molar ratio of co-catalyst to catalyst is from about 1:20 to about 1:1, preferably from about 1:10 to about 1:2.5.

The polymerization reaction is conducted in an organic solvent. Particularly preferred solvents are inert, polar solvents which may be aromatic, haloaromatic or haloalkanes. Especially preferred polar solvents are selected from the group consisting of benzene, toluene, xylene, chlorobenzene and methylene chloride.

Non-polar organic solvents, while not preferred, may also be used in conjunction with a polar solvent. The non-polar solvents may be selected from the group consisting of hexane, pentane, cyclohexane, napthas and olefins which are relatively inert under the conditions involved in the reaction, such as cyclopentene.

The total amount of solvent in the reaction mixture may range from about 60 to about 200 parts by weight per 100 parts total monomer in the reaction mixture, and is preferably from about 80 to about 120 parts by weight of the total monomer. When used with the polar solvent the amount of non-polar solvent in the reaction mixture may range from about 1 to about 50% by weight based on the total weight of solvent in the reaction mixture, and preferably ranges from about 1 to about 10% by weight of the solvent.

The monomeric reactants are added to the reaction mixture in a manner sufficient to provide the desired molar ratios of reactants to catalysts. The monomeric reactants may be added individually to the reaction mixture, but are preferably added as a mixture or blend of monomers.

It is preferred to charge the reaction vessel with the solvent and catalysts and then add the monomers to the reaction vessel over time while stirring the reaction mixture. However, the monomers and catalyst may be added to the reaction vessel essentially simultaneously, particularly when conducting a continuous polymerization reaction.

In a batch reaction sequence, the monomers may be added to the reaction mixture over a period of about 4 hours or more depending on the co-catalyst amount, reaction temperature and amount of co-monomer. In a continuous reaction, residence times of from about 3 to about 5 hours are preferred, although shorter or longer times may be used. The reaction time selected for either the batch or continuous reaction should be sufficient to provide beta-pinene resins having essentially unimodal molecular weight distributions.

During the polymerization reaction, the reaction mixture is maintained under a nitrogen atmosphere at a temperature ranging from about 35° to about 90° C., preferably from about 35° to about 60° C.

After the polymerization reaction is substantially complete, the reaction product mixture is quenched with water and heated to a temperature ranging from about 50° to about 90° C. The aqueous phase is separated from the organic phase by well known phase separation techniques such as decantation, centrifugation, extraction, drying and the like. The separated organic phase may then be washed with distilled water at the elevated temperature to remove traces of catalyst and other impurities.

The solvent is separated from the product by distillation, preferably at atmospheric pressure and under an inert gas atmosphere producing a high yield of low softening point beta-pinene resin. Separation of the solvent is typically conducted at a temperature above about 200° C. depending on the particular solvent used.

In order to facilitate a further understanding of the invention, the following non-limiting examples illustrate one or more aspects of the invention.

EXAMPLE 1

A continuous polymerization of monomer grade beta-pinene (MGB) containing 80 wt. % beta-pinene and 14 wt. % alpha-pinene was conducted by first blending 100 parts by weight of MGB, 80 parts by weight of xylene and 200 to 250 ppm water (based on the total reaction mixture) and simultaneously charging the blend and 1.5 parts by weight of aluminum chloride (AlCl$_3$) to a primary reaction vessel. The reaction mixture was stirred and the contents were maintained under a nitrogen atmosphere. The reaction was conducted at 45° C. and the reaction vessel was equipped to provide a 4 hour residence time.

The overflow from the primary reaction vessel was directed to a secondary reaction vessel to provide sufficient reaction time. Overflow from the secondary reaction vessel was quenched with water to inactivate the catalyst.

After the reaction mixture was quenched, the reaction mixture was heated to 75° C. and the aqueous phase was separated from the organic phase by decanting the organic phase. The organic phase was washed with an equal portion by volume of water at 75° C.

After washing the organic phase, the organic phase was distilled from the product under atmospheric pressure at a temperature of 240° C. The crude resin was then nitrogen sparged at 240° C. and provided a 93% yield of resin by weight with a 133° C. softening point determined by the ring and ball method of ASTM E-28-58T. The resin had a bimodal molecular weight distribution and the EVA-microcrystalline wax cloud point was 135° C. The molecular weight distribution of the resin was determined by size exclusion chromatography using polystyrene standards. The reactants, reaction conditions and product characteristics (sample 1) are given in the Table.

This example demonstrates the bimodal molecular weight distribution and high softening point obtained when MGB is polymerized in the absence of an olefinic monomer.

EXAMPLE 2

A series of continuous polymerizations was conducted using mixtures of monomer grade beta-pinene (MGB) and diisobutylene under the same reaction conditions and procedures as in Example 1, in the presence of the same proportion of catalyst and water co-catalyst.

As compared to Example 1 where no co-monomer was used, the products of this example (identified as samples 2 and 3 in the Table) had essentially unimodal molecular weight distributions. The products also had lower EVA-wax cloud points and lower softening points than the product of Example 1.

EXAMPLE 3

A series of continuous polymerizations was conducted using mixtures of monomer grade beta-pinene (MGB) and commercial alpha-pinene, ACINTENE A containing 95% by weight alpha-pinene which is commercially available from Arizona Chemical Company of Panama City, Fla. The reaction conditions, the relative proportions of catalyst and co-catalyst and procedures were as described in Example 1.

As compared to Example 1 where no co-monomer was used, the products of this example (identified as samples 4–6 in the Table) had essentially unimodal molecular weight distributions. The products also had lower softening points than the product of Example 1 and lower EVA-wax cloud points.

EXAMPLE 4

Batch polymerizations were conducted in stirred reaction vessels under a nitrogen atmosphere using a mixture of monomer grade beta-pinene (MGB) and 2-methyl-2-butene monomer. The reaction vessel was first charged with xylene followed by aluminum chloride and 200–250 ppm water co-catalyst according to Examples 2 and 3. The monomer mixture was added over a 4 hour period of time to the reaction vessel while maintaining a reaction temperature of 45° C. At the end of the monomer addition, the reaction mixture was stirred for 30 minutes. The reaction was then quenched, washed and purified according to the procedure described in Example 1.

After quenching and washing the product, the organic phase was separated from the aqueous phase and the organic phase was distilled from the product at atmospheric pressure to a temperature of 240° C. The crude resin was nitrogen sparged at 240° C.

The products obtained by this reaction (identified as samples 7 and 8 in the Table) had essentially unimodal molecular weight distributions and also had lower softening points than the product of Example 1. Determination of the molecular weights and polydispersities of samples 7 and 8 were not made, however, the softening points of the stripped resins may be used as indications of the molecular weights of the resins.

cloud points than products made with monomer grade beta-pinene alone. (Example 1 and the ZONAREZ samples).

Having now described the invention and preferred embodiments thereof, it will be recognized by those of ordinary skill that the invention may be capable of numerous modifications, rearrangements and substitutions without departing from the spirit and scope of the invention as defined by the appended claims.

What is claimed is:

1. A method for making a low softening point beta-pinene-based polyterpene resin which consists essentially of reacting a mixture containing beta-pinene monomer and an olefinic monomer selected from the group consisting of diisobutylene, dipentene, 2-methyl-2-butene, p-menthadiene and alpha-pinene in the presence of an organic solvent, an aluminum chloride or titanium chloride Lewis acid catalyst and a co-catalyst selected from the group consisting of water, an alcohol, a tertiary origanohalide and an ester at a temperature and for a time sufficient to produce a beta-pinene-based copolymer containing from about 50 to about 98 wt. % beta-pinene monomer units and having a softening point in the range of from about 85 to about 125° C. and a substantially unimodal molecular weight distribution.

2. The method of claim 1 wherein the molar ratio of olefinic monomer to beta-pinene monomer in the mixture ranges from about 2:98 to about 50:50.

3. The method of claim 1 wherein the olefinic monomer comprises diisobutylene.

4. The method of claim 1 wherein the olefinic monomer comprises p-menthadiene.

5. The method of claim 1 wherein the olefinic monomer comprises alpha-pinene.

6. The method of claim 1 wherein the olefinic monomer comprises 2-methyl-2-butene.

7. The method of claim 1 wherein the reaction temperature ranges from about 35° to about 60° C.

TABLE

| Sample # | MGB[1] (wt. %) | Co-monomer- wt. % | Xylene (wt. %) | AlCl$_3$ (wt. %) | Water. (ppm) | Reaction Time (hrs) | Yield (%) | Soft. Pt. (°C.) | Cloud Pt. (°C.) | $M_w$ | $M_n$ | Poly-dispersity ($M_w/M_n$) | Distribution |
|---|---|---|---|---|---|---|---|---|---|---|---|---|---|
| 1 | 55.1 | none | 44.1 | 0.8 | 200–250 | 4 | 93 | 133 | 135 | 1900 | 1027 | 1.85 | bimodal |
| 2 | 38.4 | DIB[2] - 6.8 | 54.2 | 0.6 | 200–250 | 4.5 | 91 | 88 | 119 | 1479 | 889 | 1.66 | unimodal |
| 3 | 46.8 | DIB[2] - 6.8 | 44.1 | 0.8 | 200–250 | 4 | 90 | 89 | 118 | 1432 | 844 | 1.70 | unimodal |
| 4 | 35.8 | AcA[3] - 19.3 | 44.1 | 0.8 | 200–250 | 4 | 88 | 113 | 118 | 1114 | 716 | 1.56 | unimodal |
| 5 | 41.3 | AcA[3] - 13.8 | 44.1 | 0.8 | 200–250 | 4 | 92 | 120 | 132 | 1347 | 826 | 1.63 | unimodal |
| 6 | 46.8 | AcA[3] - 8.3 | 44.1 | 0.8 | 200–250 | 4 | 97 | 120 | 144 | 1652 | 954 | 1.73 | unimodal |
| 7 | 40.6 | 2MB2[4] - 4.5 | 54.2 | 0.7 | 200–250 | 4 | 89 | 75 | — | — | — | — | unimodal |
| 8 | 41.8 | 2MB2[4] - 3.4 | 54.2 | 0.6 | 200–250 | 4 | 87 | 93 | — | — | — | — | unimodal |
| ZON M-1115[5] | — | — | — | — | — | — | — | 115 | <150 | 1724 | 990 | 1.74 | bimodal |
| ZON B-115[6] | — | — | — | — | — | — | — | 115 | >180 | 2708 | 1169 | 2.32 | bimodal |

[1]MGB - monomer grade beta-pinene containing 80 wt. % beta-pinene and 14 wt. % alpha-pinene.
[2]DIB - diisobutylene monomer.
[3]AcA - ACINTENE A - 95% by weight alpha-pinene monomer commercially available from Arizona Chemical Company of Panama City, Florida.
[4]2MB2 - 2-methyl-2-butene monomer.
[5]ZON M-1115 - is ZONAREZ M-1115 which is a beta pinene resin made without co-monomer commercially available from Arizona Chemical Company of Panama City, Florida.
[6]ZON B-115 - is ZONAREZ B-115 which is a beta pinene resin made without co-monomer commercially available from Arizona Chemical Company of Panama City, Florida.

As demonstrated by the foregoing examples, polymerization products made according to the invention in the presence of a Lewis acid catalyst and co-catalyst (samples 2–8) had essentially unimodal molecular weight distributions, significantly lower softening points and generally lower 8. The method of claim 1 wherein the organic solvent comprises a solvent selected from the group consisting of benzene, toluene, xylene, chlorobenzene and methylene chloride.

9. The method of claim 1 wherein the co-catalyst is water and the molar ratio of co-catalyst to catalyst ranges from about 1:10 to about 1:2.5.

10. The method of claim 9 wherein the Lewis acid catalyst is present in an amount ranging from about 0.3 to about 3% by weight based on the total weight the monomers in the reaction mixture.

11. A beta-pinene-based polyterpene resin made by the method of claim 1 containing from about 50 to about 98 wt. % beta-pinene monomer units, from about 5 to about 40 wt. % alpha pinene monomer units and from about 2 to about 50 wt. % of one or more olefinic monomer units selected from the group consisting of diisobutylene, 2-methyl-2-butene and p-menthadiene units.

12. A beta-pinene-based polyterpene resin consisting essentially of from about 50 to about 98 wt. % beta-pinene monomer units, from about 5 to about 40 wt. % alpha pinene monomer units and from about 2 to about 50 wt. % of one or more olefinic monomer units selected from the group consisting of diisobutylene, 2-methyl-2-butene and p-menthadiene units, said polyterpene resin having a softening point in the range of from about 85° to about 125° C., a substantially unimodal molecular weight distribution and a bound chlorine level of less than about 400 ppm.

13. The resin of claim 12 wherein the olefinic monomer units comprise diisobutylene units.

14. The resin of claim 12 wherein the olefinic monomer units comprise p-menthadiene units.

15. The resin of claim 12 wherein the olefinic monomer units comprise 2-methyl-2-butene units.

16. A method for making a beta-pinene-based polyterpene resin which consists essentially of reacting beta-pinene monomer with an olefinic monomer selected from the group consisting of diisobutylene, alpha-pinene, dipentene, p-menthadiene and 2-methyl-2-butene in an organic solvent in the presence of an aluminum chloride catalyst and water co-catalyst at a reaction temperature ranging from about 35° to about 60° C. for a time sufficient to produce a beta-pinene-based polyterpene resin containing from about 50 to about 98 wt. % beta-pinene monomer units and having a substantially unimodal molecular weight distribution, a softening point in the range of from about 85° to about 125° C. and a bound chlorine level of less than about 400 ppm.

17. The method of claim 16 wherein the molar ratio of olefinic monomer to beta-pinene ranges from about 2:98 to about 50:50.

18. The method of claim 16 wherein the organic solvent comprises a solvent selected from the group consisting of benzene, toluene, xylene, chlorobenzene and methylene chloride.

19. The method of claim 16 wherein the molar ratio of co-catalyst to catalyst ranges from about 1:1 to about 1:2.5.

20. The method of claim 19 wherein the aluminum chloride catalyst is present in an amount ranging from about 0.3 to about 3% by weight based on the total weight of monomers in the reaction mixture.

21. A beta-pinene-based polyterpene resin made by the method of claim 16 containing from about 50 to about 98 wt. % beta-pinene monomer units, from about 5 to about 40 wt. % alpha pinene monomer units and from about 2 to about 50 wt. % of one or more olefinic monomer units selected from the group consisting of diisobutylene, 2-methyl-2-butene and p-menthadiene units.

\* \* \* \* \*